Feb. 28, 1967  W. A. RIED ET AL  3,306,146
SUPPORT TABLE APPARATUS FOR FEEDING SHEET
METAL TO A TRAVERSING SHEAR
Filed Dec. 2, 1964  3 Sheets-Sheet 2
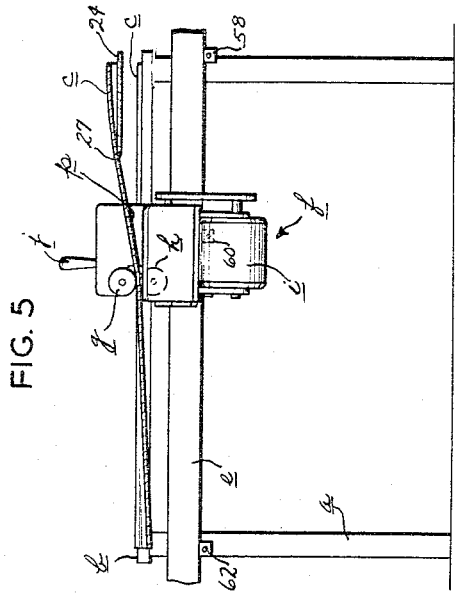
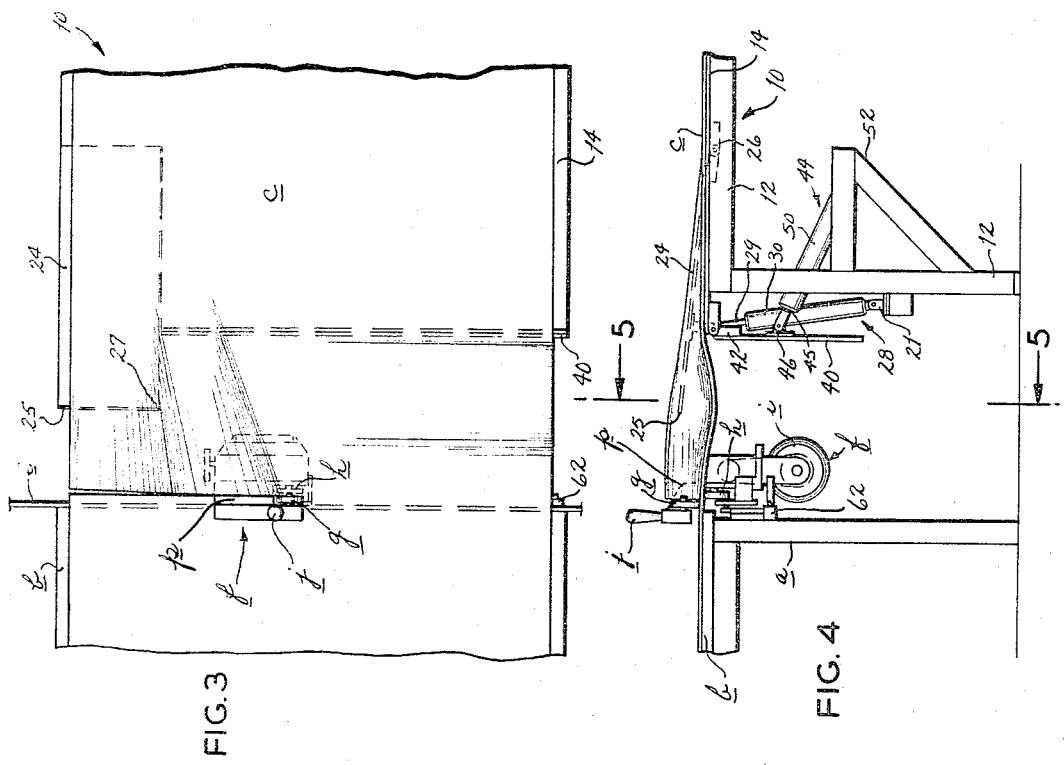
INVENTOR
WALTER A. RIED AND
JOSEPH J. SCHRADER, JR.
BY Jerome A. Gross
ATTORNEY

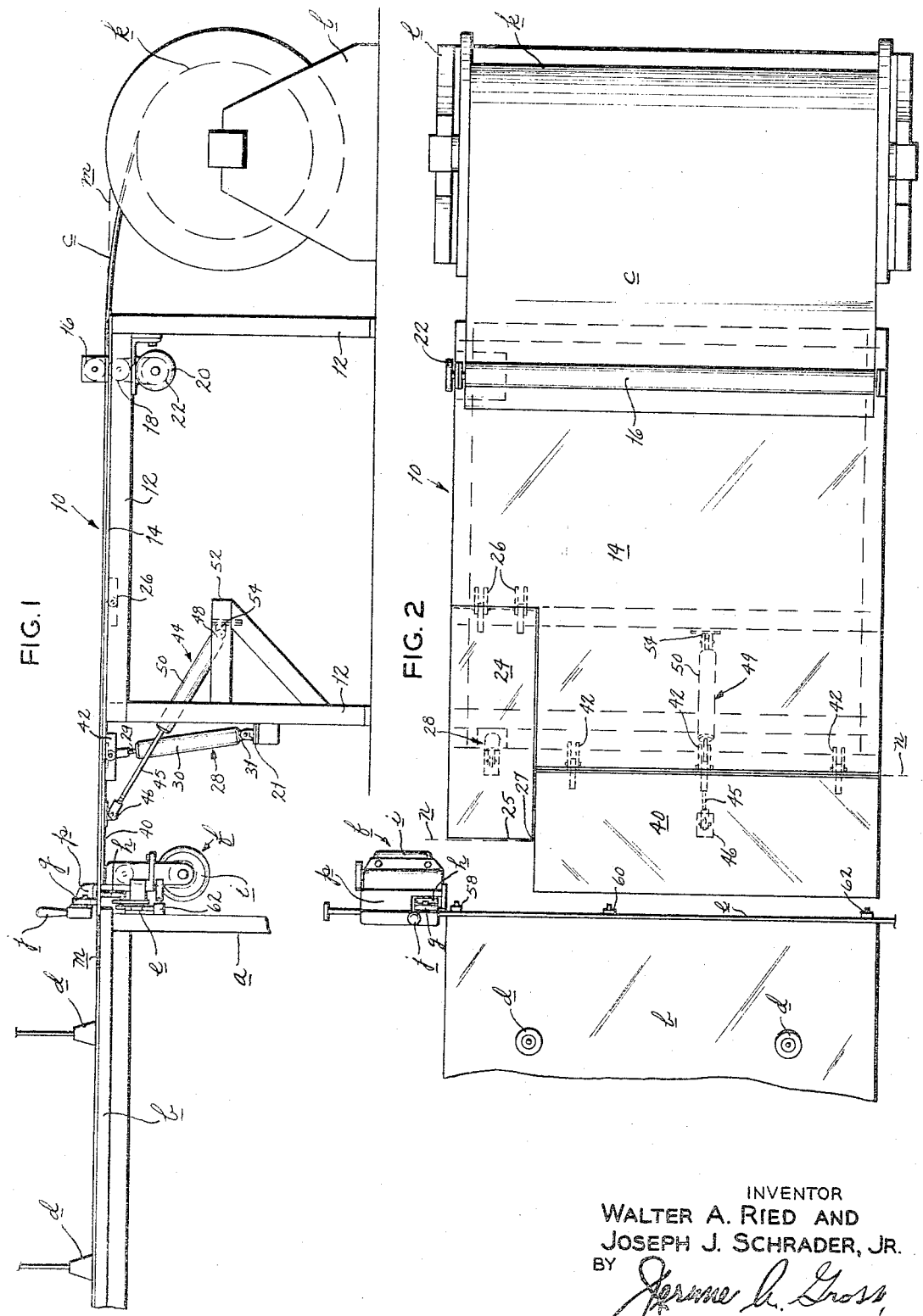

INVENTOR
WALTER A. RIED AND
JOSEPH J. SCHRADER, JR.
BY
ATTORNEY

United States Patent Office 3,306,146
Patented Feb. 28, 1967

3,306,146
SUPPORT TABLE APPARATUS FOR FEEDING SHEET METAL TO A TRAVERSING SHEAR
Walter A. Ried, St. Louis, and Joseph J. Schrader, Jr., Florissant, Mo., assignors to Engel Equipment, Inc., St. Louis, Mo., a corporation of Missouri
Filed Dec. 2, 1964, Ser. No. 415,434
11 Claims. (Cl. 83—176)

The present invention relates generally to support table apparatus for use in feeding sheet material from a supply coil to a cut-off shear, or the like. More specifically, present invention relates to support table apparatus used with a shear table having a powered progressive cutter, which cuts sheet material along an end edge of the table. Powered progressive cutters of this type are shown in U.S. Patents No. 2,708,480 and No. 2,946,251, granted to Charles F. Engel.

The cutter disclosed in the above-mentioned patents shears the material progressively. A lower cutter wheel is powered along the outer side of the line of cut below the sheet. The lower wheel co-operates with an upper cutter wheel powered along the inner side of the line of cut above the sheet. The frame of the cutter is drawn by the cutters along a track mounted below the surface of the shear table. Aft of the point of engagement of the cutter wheels with the sheet material, the frame is bridged across the line of cut to present the upper cutter wheel to the upper surface of the sheet and to deliver power to it.

A problem of clearing the aft bridging portion has existed in shearing sheet metal progressively. A typical example is where sheet metal is being supplied from a coil by means of feed rollers, or the like. The restraint offered by the feed rollers tensions the sheet material to the point where the powered cutter may stall.

The purposes of this invention are to provide support table apparatus, for use with a shear table and powered progressive cutter, which:

Inclines the cut portion of the sheet upwardly aft of the cutter wheels to permit the cutter to progress forwardly without binding;

Permits the uncut portion of the sheet material to sag downwardly in advance of the cutter to lessen the rate of change of inclination of the sheet presented to the cutter; and Provides for an angle of inclination of that portion of the sheet material presented to the cutter, which is substantially maintained as the cutter advances.

In the present invention these purposes (as well as others apparent herein) are achieved generally by providing support table apparatus including a frame, a set of powered feed rollers mounted to the frame, and a horizontal planar top fixed to the frame to provide a lay-up support plane at the level of a shear table located adjacent thereto. The support table is characterized by the planar top having a liftable plate portion hinged to the fixed top portion, and a linear actuator for increasingly projecting the liftable plate above the level of the support plane. By the use of such apparatus, the angle of inclination of that portion of the sheet material presented to the cutter is substantially maintained as the cutter advances.

As illustrated herein, the support table may be further characterized by a downwardly retractable plate portion hinged also to the fixed top portion. This retractable plate terminates in close proximity to the adjacent shear table so as to support the sheet material fed thereto. Upon withdrawal of this retractable plate below the level of the lay-up support plane, a gap is provided in advance of the cutter to allow the uncut sheet portion to sag downwardly.

Utilization of the invention will become apparent to those skilled in the art from the disclosures made in the following description of the preferred embodiment of the invention as illustrated in the accompanying drawings, in which:

FIG. 1 is an elevational view of the support table apparatus of the present invention interposed between a sheet supply coil and a shear table, with the sheet laid out over both of the tables;

FIG. 2 is a plan view of the apparatus of FIG. 1 with the sheet metal backed off toward the supply coil end of the support table;

FIG. 3 is a fragmentary plan view of the apparatus of FIG. 1 showing the powered cutter traversing the sheet metal with the downwardly-retractable plate portion of the support table retracted and the upwardly-liftable plate portion partially raised;

FIG. 4 is an elevational view taken along the line 4—4 of FIG. 3 showing a portion of the sheet metal sagging downwardly into a gap provided in advance of the cutter, the cut portion aft thereof being raised;

FIG. 5 is a cross-sectional view taken along line 5—5 of FIG. 4; and

Figure 6:
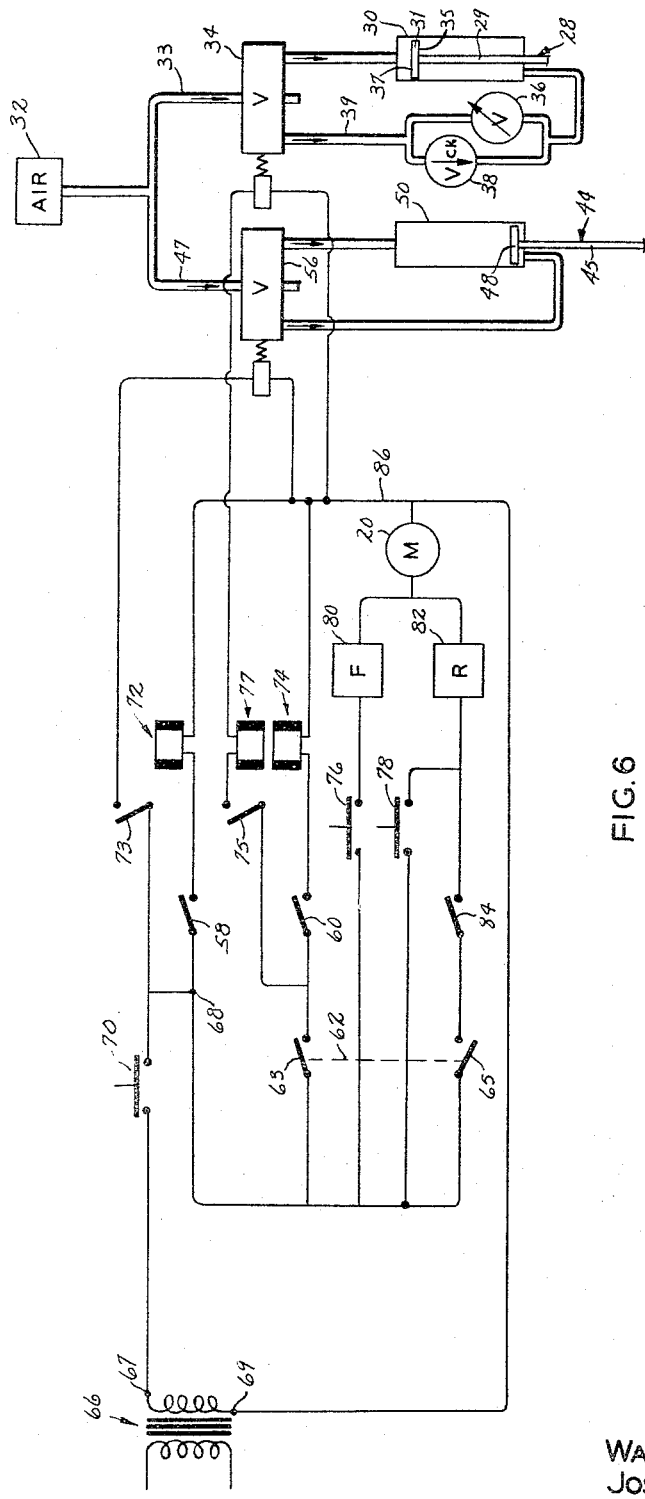
FIG. 6 is a schematic diagram showing the electrical circuit and fluid pressure circuit utilized to actuate the movable portions of the support table.

Referring now to the figures, wherein like reference characters designate like or corresponding parts throughout the several views, there is shown in FIG. 1 a shear table $a$ having a metal top $b$ across which sheet metal $c$ may be fed and clamped securely thereto by means of suitable electromagnets $d$. At its one end, the shear table $a$ is provided with an underslung rail $e$ (see FIG. 5) over which a motor-powered cutter $f$ travels in cutting transversely across the sheet metal $c$. The rail $e$ may be slightly inclined upwardly from the initial position of the cutter at the rear of the shear table (the right side of the shear table $a$ as viewed in FIG. 5) to the completed-cut position (the left side of the shear table $a$ as viewed in FIG. 5). By inclining the rail $e$ in this manner, the self-propelled cutter $f$ may be returned from the completed-cut position to the initial position under the influence of its own weight.

The frame of the self-propelled cutter $f$ carries an upper inner cutter disc or wheel $g$ and a lower outer cutter wheel $h$ both powered by the electric cutter motor $i$, which overlap each other in shearing relation at the level of the shear table $a$ and thus cooperate with each other along the line of cut to shear the sheet metal $c$. Aft of the lower outer cutter wheel $h$, the cutter $f$ has a ramp $p$ which slopes upwardly from the level of the line of cut, to permit the cut portion of the sheet material to bridge over the gearing mechanism which transmits the power across the line of cut inwardly to the upper cutter wheel $g$. A handle $j$ is provided at the top of the cutter frame so that a worker may draw the cutter forward from its initial or "rest" position at the rear of the shear table $a$ to engage the cutter wheels $g$, $h$, with the sheet $c$. A powered cutter of the type so described is shown in greater detail in U.S. Patent 2,946,251 mentioned hereinabove.

As may best be seen from FIGS. 1 and 2, the sheet metal $c$ is delivered to the shear table $a$ by means of feed rollers (to be described hereinafter) from a coil $k$ rotatably supported by a cradling structure $l$. The sheet metal $c$ is held taut between the feed rollers and the electromagnets $d$. This tensions the sheet sufficiently so that it tends to bind and restrain the after bridging portion of the cutter frame, to the point where stalling of the cutter $f$ may occur.

To overcome this problem, the support table, generally designated 10, has been devised. It is positioned between the sheet metal supply coil k and the shear table a; and includes a fixed lay-up support, an unpwardly-liftable portion, and a downwardly-retractable portion.

Fixed support means

Leg and rail members 12 are welded together to form a table frame to which a flat top 14 is securely affixed. The flat top 14 establishes a horizontal lay-up support plane, indicated by the dashed line m—m located at substantially the same level or slightly higher than the shear table top b. The table top 14 is spaced apart from the shear table end to provide a gap, designated by the dashed line n—n of FIG. 2. This gap not only permits the travel of the cutter f between the shear table a and support table 10, but when its forward portion is opened (as hereafter described) also allows the sheet metal c to sag downwardly in advance of the cutter f.

Toward the end of the support table 10 nearest the sheet metal coil k, a set of feed rollers 16, 18 is mounted by the rail members 12. The rollers 16, 18 are mounted for reversible rotation and extend horizontally across the fixed top 14. They are driven by means of an electric motor 20 and suitable gears 22, which are selectively energized to advance the sheet metal toward and away from the cutting edge of the shear table a.

Lifting means and its actuator

An upwardly-liftable plate 24 is provided at the outlet end of the support table 10 adjacent to the rear side at which the cutter begins its travel. In the embodiment illustrated, it is hingedly connected to the fixed top 14 by the hinges 26; and extends from its hinged connections 26 along the path in which the sheet metal c is fed. The liftable plate 24 terminates short of the shear table a to provide the minimum width rear portion of the gap indicated by dashed line n—n of FIG. 2. As may be seen from FIGS. 3–5, the liftable plate 24 may be pivoted about its hinged connections 26 so that its outlet end 25 will gradually rise above the level of the lay-up support plane m—m, to raise the cut portions of the sheet after the cutter has progressed forwardly of the plate 24. This so raises the cut portions of the sheet that the cutter and particularly its ramp p may progress easily therebeneath.

Referring to FIG. 5, when the liftable plate 24 is substantially elevated, only the forward corner 27 of its outlet end 25 may be in actual contact with the under surface of the cut portions of the sheet. For this reason the forward corner 27 is preferably rounded and polished.

Powered linear actuator means are provided to project the liftable plate 24 increasingly upward above the lay-up support plane m—m as the cutter f traverses the sheet metal c. As hereinafter related, the actuator means begins its upward movement after the cutter has reached a predetermined position along its cutting path and then continues to move upward at a rate corresponding to the distance traveled by the cutter f.

Such linear powered actuator means includes a fluid-pressure operated piston 28 which has its rod portion 29 pivotally connected to the underneath surface of the upwardly-liftable plate 24 and its piston body portion 31 received within a cylinder 30. The end of the cylinder 30 opposite that from which the rod portion 29 protrudes is pivotally coupled to the support table frame, as indicated at 21. A source of fluid pressure, for example, and air compressor 32, shown schematically in FIG. 6, is provided to extend and retract the rod portion 29. As may be seen from FIG. 6, a solenoid-controlled distribution valve 34 is connected in the fluid line 33 between the air compressor 32 and the cylinder 30 to alternately direct the air pressure to the upper side 35 or the lower side 37 of the piston body 31, as called for by the control circuitry, to be described. A variable, fluid-flow adjusting valve 36 is provided in the fluid line 39 to control the rate of extension of the rod portion 29 from the cylinder 30; such extension being adjustable by the valve 36 to correspond with the rate of cutter travel, and therefore, the distance moved by it across the shear table a. A check valve 38 is provided in the fluid line 39 in parallel with the fluid-flow adjustment valve 36 so that when the fluid pressure is being applied by line 39 to the upper side 35 of the piston body 31, the piston 28 will be rapidly returned to its retracted position. Thus, the fluid-flow adjustment valve restricts the rate of extension of the piston 28, when pressure is applied to the lower side 37 of the piston 28, while the check valve 38 insures that the piston 28 will be returned to its retracted position rapidly when pressure is applied to the upper side 35.

Downwardly-retractable gap-opening means and its actuator

A downwardly-retractable plate 40 is hinged to the outlet end of the fixed top 14 of the support table 10. In its raised position at the level of the top 14, the plate 40 extends within the gap indicated by dashed line n—n to terminate in close proximity to the shear table a, at substantially the same level or, if preferred, slightly higher. It is withdrawable to a lowered, retracted vertical position below the level of the lay-up support plane m—m by means of hinges 42.

Linear actuator means are provided to withdraw the retractable plate 40 below the lay-up support plane m—m. Such means includes a fluid-pressure operated piston 44 having its rod portion 45 pivotally coupled to a fitting at the undernearth surface of the retractable plate 40, as shown at 46, and its body portion 48 received within a cylinder 50. The cylinder 50 has its end opposite that of the piston rod 45 pivotally connected to a sub-frame assembly 52 of the support table 10, as indicated at 54. The air compressor 32 which supplies the pressure to piston 28 likewise operates piston 44 through a fluid line 47 which includes a solenoid-operated distribution valve 56. The distribution valve 56 alternately applies pressure above or below the piston body 48 of piston 44 as called for by the control circuitry to be described.

Electric operation control circuit

Referring to FIGS. 2 and 5, there are shown three limit switches, 58, 60, and 62, spaced from each other along the shear table rail e. The limit switch 60 is of the spring-urged type while switches 58 and 62 are resettable. The limit switches 58–62 are arranged along the shear table rail e so that they may be contacted by an actuating finger 64 carried by the cutter f as it travels across the rail e. The limit switch 58 is located adjacent to the starting position of the cutter f and serves to energize the electric circuit (to be described hereinafter) for withdrawing the downwardly-retractable plate 40 below the support plane m—m when the cutter f begins its travel across the shear table edge. The limit switch 60 is located at a predetermined position at which the cutter has progressed beyond the upwardly-liftable plate 24 (see FIG. 3) and serves to energize the electric circuit (to be described hereinafter) for raising the plate 24 above the support plane m—m. The limit switch 62 is located at the far side of the shear table a adjacent to where the cut is completed and serves to energize the electric circuit (to be described hereinafter) for returning the lift plate to its lowered position. This limit switch 62 is a ganged switch and further energizes a circuit which reversingly drives the electric motor 20.

Referring to FIG. 6, it may be seen that the secondary coil of a transformer 66 has its terminal 67 connected to a junction 68 by means of a manually-operated on-off switch 70. Relays 72 and 74 are provided with their respective contact arms 73, 75 in separate circuits connecting the junction 68 with the solenoid-operated distribution valves 56 and 34, respectively. The limit switch 58 which is connected in series with the energizing coil or relay 72 controls the switching of contact arm 73. Similarly the switching of contact arm 75 of relay 74 is controlled by the normally-closed contact arm 63 of ganged limit switch 62 and limit switch 60, both connected in series with the energizing coil of relay 74.

The junction 68 is also electrically connected to the electric motor 20 by means of two separate and parallel circuits which include manually-operated switches 76 and 78, respectively. The manually-operated switches 76 and 78 are in turn connected to conventional forward and reverse drive circuits 80 and 82, respectively, which are called upon to control the driving direction of electric motor 20. The manually-operated switch 78 is shunted by a circuit consisting of the normally-open contact 65 of the ganged limit switch 62 and a time-delay operated switch 84 connected in series. All of the circuits branching from the junction 68 are returned to the terminal 69 of the secondary coil of the transformer 66 by means of a junction 86.

Operation

The sheet metal c is unwound from the coil k and presented between the feed rollers 16 and 18. The on-off switch 70 and manually-operated switch 76 are then closed to energize the forward drive circuit 80 of the electric motor 20. Power is transmitted from the motor 20 through the gears 22 and to the feed rollers 16, 18 which advance the sheet metal c over the fixed flat top 14 of the support table 10. With the upwardly-liftable plate 24 and downwardly-retractable plate 40 held in the positions shown in FIGS. 1 and 2 by means of the air pressure supplied to pistons 28 and 44, the sheet metal c is conveyed across the gap and fed out across the shear table top b. The operator determines the length of sheet material to be sheared from the coil by using the manually-operated switches 76 and 78 to fix the position of the sheet metal over the line of cut at the end of the shear table a. After the position of the sheet metal has been set at the desired length, the electromagnets d are energized to clamp the sheet metal c to the shear table top b.

The operator then starts the cutter motor i and advances the cutted f along its rail e until the upper and lower wheels g, h engage the sheet metal c. These cutter wheels g, h draw the cutter f along the rail e progressively shearing the sheet metal c as it travels.

When the cutter f has advanced sufficiently to cause its actuating finger 64 to engage the limit switch 58, it will close, allowing current flow through the energizing coil of relay 72 to the junction 86. This current flow closes the contact arm 73 of relay 72 and causes current to flow from the secondary winding of transformer 66 through the closed on-off switch 70 to the solenoid-operated distribution valve 56 and back to the secondary winding. Air pressure being supplied from the air compressor 32 through the valve 56 to the lower side of piston body 48, will be re-routed by the switching of the distribution valve 56 and applied to the upper side of the piston body 48. The re-routed air pressure will cause the piston 44 to be withdrawn into its cylinder 50, thereby withdrawing the downwardly-retractable plate 40 below the support plane m—m to the position shown in FIGS. 3–5. As may be readily seen from these figures, withdrawal of the plate 40 does not only permit the cutter to travel through the gap at the inlet side of the shear table but also allows the uncut sheet portion to sag downwardly in advance of the cutter f. It is to permit such sagging in advance of the cutter that the forward portion of the gap demarked by the staggered line n—n is so much broader than the rear portion of the gap which the cutter first enters. The importance of permitting the forward portion of the sheet to sag as the cut portion aft of it is raised, will be discussed hereinafter.

Further advancement of the cutter f across the sheet c will temporarily close spring-urged limit switch 60, allowing current to flow from the transformer 66 through the on-off switch 70, junction 68, the normally-closed contact arm 63 of limit switch 62, the energizing coil of the relay 74 and back to the transformer secondary. The current flow through the energizing coil of relay 74 closes the relay contact arm 75 allowing the current to flow from junction 68 through the holding coil 77 of relay 74 to the solenoid-operated distribution valve 34 and back to the secondary of the transformer 66. The air pressure being supplied from the compressor 32 through the check valve 38 to the upper side 35 of the piston body 31 will be re-routed by the energization of the distribution valve 34 to the lower side 37 of piston body 31. The piston 28 will begin to extend itself at a rate which is determined by the variable setting of the fluid-flow adjustment valve 36. Thus, as the cutter f gradually advances across the rail e from the limit switch 60, the plate 24 will be lifted above the support plane m—m at a rate corresponding to the advancement of the cutter f. After the cutter f has passed over the spring-urged limit switch 60, it re-opens. However, the contact arm 75 of relay 74 is held closed by the holding relay 77.

Upon reaching the far side of the shear table a, the cutter finger 64 engages the ganged limit switch 62 opening its normally-closed contact arm 63 and closing its normally-open contact arm 65. By opening the normally-closed contact of the ganged limit switch 62, current is interrupted in the circuit of the holding relay 77 of relay 74. The contact arm 75 opens, thus switching the solenoid-operated distribution valve 34 back to its original state. This action immediately applies the air pressure to the piston to return the liftable plate 24 to its lowered position.

Simultaneous with the lowering of the liftable plate 24, current flows through the closed contact arm 63 and is conducted through the time-delay operated switch 84 to reversingly drive the motor 20 and feed rollers 16, 18 for a predetermined time period, after which the switch 84 opens to stop the reverse drive of motor 20. The reverse drive automatically withdraws the sheet metal c from the gap so that the cutter f under its own weight will return down the inclined rail e to its initial position. In returning to its initial position the cutter f resets the limit switches 58 and 62 and switch 84 so that the plates 24 and 40 are returned to their initial position (FIGS. 1 and 2) and the control circuit reset for further use.

The sagging of the sheet metal in advance of the cutters and the progressive raising of the cut portion of the sheet metal c aft of the cutter wheels, as shown in FIG. 5, together tend to maintain that portion of the sheet being presented to the cutter f at substantially the angle of inclination of the cutter ramp p. This is important for the reason that it avoids an abrupt change in the inclination of the material which might otherwise bind against the ramp p and tend to stall the cutter.

Obviously many modifications and variations of the present invention are possible in the light of the above teachings. It is therefore to be understood that within the scope of the appended claims, the invention may be practiced other than as specifically described.

We claim:
1. For use with a shear table of the type having a powered cutter which progressively traverses sheet material fed across an edge of such shear table, support table apparatus comprising
    fixed means to support sheet material in a substantially horizontal plane spaced apart from the shear table, whereby to provide a gap therebetween for travel of the cutter therethrough, and
    upwardly-liftable means projectable above the level of said support means and located in the path in which such material is fed and adjacent to the side thereof at which the cutter begins its travel, for raising the cut portion of the sheet material spanning the gap, whereby to incline the cut portion of the sheet width upwardly and thus permit the cutter to progress unimpeded across the entire sheet width.

2. The support table apparatus of claim 1, together with
powered means engaging said liftable means to project said liftable means above the level of the sheet material support means increasingly as the traveling cutter progresses across the sheet material,
whereby the angle of inclination of that portion of the material presented to the cutter is substantially maintained as the cutter advances.

3. The support table of claim 1, further comprising
downwardly-retractable means adjacent to said fixed support means and having an extended position within the gap at which to support the sheet material in close proximity to and substantially at the same level as the shear table,
said retractable means being withdrawable to a retracted position below the level of said support means,
whereby to open the gap in advance of the cutter to permit its travel and also to permit the uncut sheet portion to sag downwardly in advance of the cutter.

4. The support table of claim 3, further comprising
powered means engaging said downwardly-retractable means to retract and re-erect the downwardly-retractable means from and to the level of said support means, respectively.

5. For use with a shear table of the type having a powered cutter which progressively traverses sheet material fed across an end of such shear table, support table apparatus of the type having
a frame,
a set of powered feed rollers mounted to said frame and extending horizontally thereacross, and
a horizontal planar top carried by said frame, including a fixed portion whereby to provide a lay-up support plane at the level of the shear table,
said apparatus being characterized by said planar top having
a liftable plate portion having a hinged connection to said fixed top portion and actuator means connected thereto, whereby at least a part of said liftable plate is projected increasingly upward above the level of said lay-up support plane as the cutter traverses such sheet material,
whereby the angle of inclination of that portion of the material presented to the cutter is substantially maintained as the cutter advances.

6. The support table apparatus as defined in claim 5, further characterized by said planar top having
a downwardly-retractable plate portion extending at the level of and hinged to said fixed top portion, said retractable plate portion terminating in close proximity to such shear table,
together with means to withdraw said retractable plate portion below the lay-up support plane,
whereby to provide a gap in advance of the cutter into which the uncut sheet portion may sag downwardly.

7. For use with a shear table of the type having a powered cutter which progressively traverses sheet material fed across an end of such shear table, support table apparatus comprising
a frame,
a fixed planar top spaced apart from the shear table and secured to said frame, whereby to define a lay-up support plane at the level of such shear table,
a liftable plate between said fixed top and such shear table and hingedly connected to said fixed top adjacent to the side thereof at which the cutter begins its travel and terminating short of the end of such shear table, whereby to admit the cutter therebetween,
a fluid pressure linear actuator pivotally coupled between said frame and said liftable plate, said actuator being valved for progressive extension,
a valved fluid pressure supply source connected to said actuator, and
a switch disposed along the path of the cutter at a predetermined distance from the position at which the cutter begins its travel, said switch being so connected to said pressure supply source as to extend said actuator.

8. The support table defined in claim 7, further comprising
fluid flow inlet adjustment means to regulate the rate of extension of said linear actuator.

9. The support table defined in claim 7, further comprising
a downwardly-retractable plate having a hinged connection between its one side edge and said planar top, its other side edge terminating in close proximity to and at the level of the end of such shear table, whereby downward withdrawal of said plate from the level of said fixed top provides a gap in advance of the cutter into which the uncut sheet portion may sag,
a second fluid pressure linear actuator pivotally coupled between said downwardly-retractable plate and said frame end connected to said valved fluid pressure supply source, and
a second switch disposed in the path of the cutter, said second switch being so connected to said valve fluid pressure supply source as to retract said second linear actuator upon the cutter contacting said second switch.

10. The support table defined in claim 9, further comprising
a set of powered reversible feed rollers mounted to said frame and extending horizontally thereacross,
an electric motor coupled to said feed rollers,
a reversing switch disposed in the path of the cutter at the edge of the sheet opposite the initial position of the cutter, said reversing switch being electrically connected to said electrical motor, whereby to reverse the drive of said feed rollers.

11. The support table defined in claim 10, further comprising
a time-delay cut-off relay in series circuit with said third switch and said electric motor, whereby the sheet is withdrawn a predetermined limited distance from the path of the cutter.

References Cited by the Examiner
UNITED STATES PATENTS

| 1,379,597 | 5/1921 | Trogner | 83—17 |
| 1,888,754 | 11/1932 | Alexander et al. | 87—176 |

WILLIAM S. LAWSON, *Primary Examiner.*